(12) United States Patent
Fraser et al.

(10) Patent No.: US 8,318,007 B2
(45) Date of Patent: Nov. 27, 2012

(54) ULTRAVIOLET RADIATION LAMP AND SOURCE MODULE AND TREATMENT SYSTEM CONTAINING SAME

(75) Inventors: Jim Fraser, Rosebury Place (CA); Joseph Elku, Tilsonburg (CA); Michael Sasges, Victoria (CA)

(73) Assignee: Trojan Technologies (CA)

( * ) Notice: Subject to any disclaimer, the term of this patent is extended or adjusted under 35 U.S.C. 154(b) by 906 days.

(21) Appl. No.: 12/065,501

(22) PCT Filed: Aug. 31, 2006

(86) PCT No.: PCT/CA2006/001420
§ 371 (c)(1),
(2), (4) Date: Oct. 10, 2008

(87) PCT Pub. No.: WO2007/025376
PCT Pub. Date: Mar. 8, 2007

(65) Prior Publication Data
US 2009/0090667 A1 Apr. 9, 2009

Related U.S. Application Data

(60) Provisional application No. 60/712,409, filed on Aug. 31, 2005.

(51) Int. Cl.
*B01D 17/12* (2006.01)
*C02F 1/30* (2006.01)
*H01J 7/24* (2006.01)

(52) U.S. Cl. ............ 210/85; 96/224; 210/149; 210/192; 250/432 R; 313/10; 422/186.3

(58) Field of Classification Search .......... 96/224, 96/420; 210/85, 143, 149, 192, 748.1, 748.11, 210/748.12, 87, 97, 739, 746; 315/32, 56, 315/326; 250/428, 429, 432 R, 435, 436, 250/504 R; 361/93.8; 422/24, 121, 186.3; 313/10, 11, 37

See application file for complete search history.

(56) References Cited

U.S. PATENT DOCUMENTS

| 3,309,565 A | 3/1967 | Clark et al. |
| 3,591,828 A | 7/1971 | Washimi et al. |
| 3,859,555 A | 1/1975 | Latassa et al. |
| 4,336,223 A * | 6/1982 | Hillman .......................... 422/24 |

(Continued)

FOREIGN PATENT DOCUMENTS

CA 2451590 A1 1/2003

(Continued)

OTHER PUBLICATIONS

International Search Report in the corresponding International Application No. PCT/CA2006/001420.

(Continued)

*Primary Examiner* — Joseph Drodge
(74) *Attorney, Agent, or Firm* — Katten Muchin Rosenman LLP

(57) ABSTRACT

The invention relates to an ultraviolet radiation lamp. The lamp comprises a substantially sealed cavity comprising a mercury-containing material; a filament disposed in the sealed cavity; and an electrical control element in contact with the filament, the electrical control element configured to adjust or maintain a temperature of the mercury-containing material with respect to a prescribed temperature. Such a constructions allows the present ultraviolet radiation lamp to be operated at optimal efficiency without the need to use additional components to add heat to and/or remove heat from the mercury-containing material.

57 Claims, 2 Drawing Sheets

U.S. PATENT DOCUMENTS

| | | | |
|---|---|---|---|
| 4,482,809 A | 11/1984 | Maarschalkerweerd | |
| 4,665,627 A | 5/1987 | Wilde et al. | |
| 4,835,442 A | 5/1989 | Sugimoto et al. | |
| 4,872,980 A | 10/1989 | Maarschalkerweerd | |
| 5,006,244 A | 4/1991 | Maarschalkerweerd | |
| 5,230,792 A * | 7/1993 | Sauska et al. | 210/97 |
| 5,274,305 A | 12/1993 | Bouchard | |
| 5,418,370 A | 5/1995 | Maarschalkerweerd | |
| 5,539,210 A | 7/1996 | Maarschalkerweerd | |
| 5,909,085 A | 6/1999 | Nelson | |
| RE36,896 E | 10/2000 | Maarschalkerweerd | |
| 6,217,834 B1 | 4/2001 | Hosein et al. | |
| 6,264,836 B1 * | 7/2001 | Lantis | 210/188 |
| 6,316,877 B1 | 11/2001 | Kaas | |
| 6,583,540 B2 * | 6/2003 | Al-Refai | 313/316 |
| 7,061,173 B2 * | 6/2006 | Fischer et al. | 313/490 |
| 7,252,763 B2 * | 8/2007 | Kuennen et al. | 210/192 |
| 2004/0100749 A1 * | 5/2004 | Lentz et al. | 361/93.8 |
| 2004/0195954 A1 | 10/2004 | Pirovic | |
| 2004/0232846 A1 | 11/2004 | Fischer | |
| 2005/0103717 A1 * | 5/2005 | Jha et al. | 210/652 |
| 2005/0178984 A1 * | 8/2005 | Brickley | 250/504 R |
| 2005/0232825 A1 * | 10/2005 | Fowler et al. | 422/121 |
| 2008/0138254 A1 * | 6/2008 | Kurtz et al. | 422/121 |
| 2009/0065413 A1 | 3/2009 | Fraser et al. | |

FOREIGN PATENT DOCUMENTS

| | | |
|---|---|---|
| WO | WO 96/31902 | 10/1996 |
| WO | 2004/114360 A2 | 12/2004 |
| WO | 2005/010920 A2 | 2/2005 |

OTHER PUBLICATIONS

Office Action for Canadian Patent Application No. 2,621,301 with a mailing date of Jun. 11, 2010.

The First Office Action for Chinese Patent Application No. 200680031450.0 mailed by The Patent Office of the People's Republic of China on Jan. 8, 2010.

The Second Office Action for Chinese Patent Application No. 200680031450.0 mailed by the State Intellectual Property Office of the People's Republic of China on Jun. 20, 2011.

Oct. 21, 2011 Office Action for European Patent Application No. 06 790 599.2.

Supplementary European Search Report for European Patent Application No. 06 790 599.2, with a date of completion of Sep. 29, 2011.

* cited by examiner

ULTRAVIOLET RADIATION LAMP AND SOURCE MODULE AND TREATMENT SYSTEM CONTAINING SAME

FIELD OF THE INVENTION

In one of its aspects, the present invention relates to an ultraviolet radiation lamp. In another of its aspects, the present invention relates to a radiation source module comprising the ultraviolet radiation lamp. In another of its aspects, the present invention relates to a fluid treatment system comprising the ultraviolet lamp

DESCRIPTION OF THE PRIOR ART

Fluid treatment systems are known generally in the art.

For example, U.S. Pat. Nos. 4,482,809, 4,872,980, 5,006,244, 5,418,370, 5,539,210 and Re:36,896 (all in the name of Maarschalkerweerd and all assigned to the assignee of the present invention) all describe gravity fed fluid treatment systems which employ ultraviolet (UV) radiation.

Generally, such prior fluid treatment systems employ an ultraviolet radiation lamp to emit radiation of a particular wavelength or range of wavelengths (usually between 185 and 400 nm) to effect bacterial kill or other treatment of the fluid being treated. Many conventional ultraviolet radiation lamps are known as "low pressure" mercury lamps.

In recent years, the art in low pressure mercury lamps has evolved with the development of the so-called Low Pressure, High Output (LPHO) and amalgam UV radiation lamps. These lamps have found widespread use in UV radiation water treatment systems, particularly those used for treatment of municipal drinking water and wastewater. As used herein, the term "low pressure" UV radiation lamp is intended to encompass conventional UV radiation lamps, LPHO UV radiation lamps and amalgam UV radiation lamps.

In use, it is usually necessary that a "cold portion" be maintained in such lamps to act as a mercury reservoir for the lamp thereby maintaining an appropriate mercury vapour pressure for efficient emission of ultraviolet radiation. The mercury reservoir may be liquid mercury or may be an amalgam of mercury and another material such as indium. If the "cold portion" temperature is not within a narrow temperature range, the mercury vapour pressure in the low pressure lamp may not be suitable for efficient generation of UV radiation. Specifically, too high or too low a "cold portion" temperature will result in loss of efficiency of emission of UV radiation. This can lead to inadequate treatment of the fluid being treated, particularly since the fluid temperature may vary and the power level and resulting temperature of the lamp may also vary.

When such mercury lamps are used in a fluid treatment system such as one of the specific systems described and illustrated in the Maarschalkerweerd patents referred to above, the necessary "cold portion" is achieved through heat exchange with the water being treated.

It is known in the art to use passive means to maintain the necessary "cold portion". For example, U.S. Pat. No. 6,217,834 [Hosein et al.] teaches placement of a heat absorbing element on the exterior of the ultraviolet lamp as a passive means to create a "cold portion" in the lamp which allows for efficient emission of ultraviolet radiation. In use, the heat absorbing element in the present ultraviolet radiation lamp functions as a "heat sink" on the exterior surface of the lamp. As such, during use, the heat absorbing element removes heat from the area of the lamp with which it is in contact. The result is the creation of a "cold portion" on the interior surface of lamp (i.e., wherein the mercury vapour is contained) corresponding to that area. The mercury vapour condenses on the "cold portion" thereby resulting in efficient emission of ultraviolet radiation from the lamp.

It is also known to use passive control of a mercury reservoir (amalgam) through thermal conduction to lower temperature surroundings or structures, and to have this thermal connection vary with temperature with, for example, bimetallic elements—see, for example, U.S. Pat. No. 3,309,565. See also, for example, International Publication Number WO 96/31902 which teaches control of amalgam temperature through a bimetallic switch used to variably conduct heat away from the amalgam feature(s).

It is also known to use an externally regulated heater to control the temperature of an over-cooled mercury reservoir—i.e., the reverse situation being addressed by Hosein et al. This approach requires the use of: (i) electrical power connections running from the heater to a power supply, and (ii) a sensor signal running from the heater to a power regulation device.

It is known to provide current through a lamp filament in order to maintain the filament at a temperature suitable for electron emission.

There is also prior art for positioning the amalgam near the filament to take advantage of the heat naturally generated by the operating filament, and, as discussed above, there is prior art relating to the use of external heaters to raise amalgam temperature.

Copending U.S. patent application Ser. No. 60/682,809 [Fraser et al.] teaches an ultraviolet radiation lamp in which a heating unit is disposed exteriorly with respect to a cavity comprising a mercury-containing material. The heating unit is configured so as to be disposed in contact with a first portion of the cavity comprising the mercury-containing material. The heating unit has an adjustable heat output.

These prior art approaches necessitate the use of additional elements to provide heat to or remove heat from the lamp to control the temperature of the amalgam feature.

In prior art it is well known that controlling filament temperature at low lamp input power settings can enhance filament life. It is also known that controlling the amalgam or mercury reservoir temperature through the use of heating or cooling elements can improve lamp efficiency by controlling the mercury vapour pressure.

It is also known to use an amalgam feature actually attached to or near the filament so that the amalgam is heated by the arc or filament temperature. Such an approach has the disadvantage that the amalgam temperature is not independent of amp arc current. Amalgam temperature drops when the arc power is reduced, and the amp efficiency can drop as a consequence.

Ultraviolet radiation lamps are thermal devices that are increasingly being operated at higher power levels to provide increased ultraviolet radiation output, resulting in a need to control the increasing thermal conditions, in order to optimize the lamp efficiency. For example, some amalgam lamps can produce optimal UV output when the "cold portion" is in the range of 65° C. to 100° C.

Accordingly, there is an ongoing need in the art for a radiation lamp, particularly an ultraviolet radiation lamp, that incorporates active temperature control of an amalgam spot or mercury reservoir therein, but which does not require the presence of additional components to add heat to and/or remove heat from the lamp to control the temperature of the amalgam feature. Ideally, such a radiation lamp could be run at or near optimum mercury pressure and therefore, at optimum efficiency, independently of the temperature of the fluid being treated, the power settings of the radiation source and/or the diameter of the outer protective sleeve (if present).

SUMMARY OF THE INVENTION

It is an object of the present invention to obviate or mitigate at least one of the above-mentioned disadvantages of the prior art.

Accordingly, in one of its aspects, the present invention provides an ultraviolet radiation lamp comprising:

a substantially sealed cavity comprising a mercury-containing material;

a filament disposed in the sealed cavity; and an electrical control element in contact (e.g., electrical contact) with the filament, the electrical control element configured to adjust or maintain a temperature of the mercury-containing material with respect to a prescribed temperature.

In another of its aspects, the present invention provides an ultraviolet radiation lamp comprising:

a substantially sealed cavity comprising a mercury-containing material having a predetermined optimum temperature range in which the mercury-containing material is vaporized;

a filament disposed in the sealed cavity; and an electrical control element in contact (e.g., electrical contact) with the filament, the electrical control element configured to cause the temperature of the mercury-containing material to remain substantially within the predetermined optimum temperature range.

In yet another of its aspects, the present invention provides an ultraviolet radiation lamp comprising:

a substantially sealed elongate cavity comprising a first filament and a second filament disposed therein near opposite ends thereof;

a reservoir disposed in the cavity;

a mercury-containing material disposed in the reservoir, the mercury-containing material having a predetermined optimum temperature range in which the mercury-containing material is vaporized; and an electrical control element in contact (e.g., electrical contact) with the filament, the electrical control element configured to cause the temperature of the mercury-containing material to remain substantially within the predetermined optimum temperature range.

In yet another of its aspects, the present invention provides ultraviolet radiation lamp comprising:

a substantially sealed cavity comprising a mercury-containing material;

a filament disposed in the sealed cavity;

a detector configured to measure ultraviolet radiation (e.g., UV-C) from the sealed cavity during operation of the lamp; and an electrical control element in contact with the detector and the filament, the electrical control element configured to adjust or maintain a temperature of the mercury-containing material with respect to a prescribed temperature.

In yet other of its aspects, the present invention relates to a radiation source assembly comprising the present ultraviolet radiation lamp.

In yet other of its aspects, the present invention relates to a radiation source module comprising the present ultraviolet radiation lamp.

In yet other of its aspects, the present invention relates to a fluid treatment system comprising the present ultraviolet radiation lamp.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
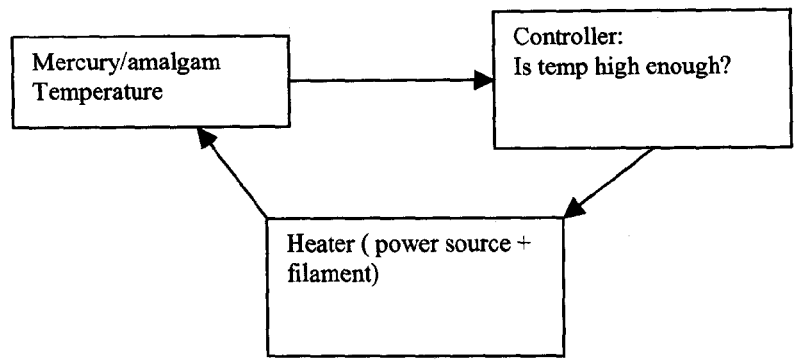
FIGS. 1 and 2 each illustrate a schematic for closed loop temperature control of a mercury amalgam lamp.

Thus, the present inventors have discovered a different approach to modulating temperature control of the mercury-containing material in an ultraviolet radiation lamp, namely by controlling the current applied to the lamp filament thereby to apply heat to the mercury-containing material. This allows the present ultraviolet radiation lamp to be operated at optimal efficiency without the need to use additional components to add heat to and/or remove heat from the mercury-containing material.

Thus, the present invention relates to controlling amalgam/mercury temperature by modulating a heating current through the filament. The amalgam temperature should be kept within a prescribed range that depends, in part, on the nature of the mercury reservoir. Pure mercury has a relatively narrow range of acceptable temperature, whereas some multi-component amalgams have a relatively large range. Reducing the number of temperature measurements/lamp (may be equal to zero) will generally reduce cost, with the drawback somewhat lower precision. In many cases, this may be acceptable if the allowable temperature range is relatively large or the operating range of power levels and environmental conditions is relatively small.

There are three general embodiments for controlling amalgam/mercury temperature by modulating a heating current through the filament.

Closed loop temperature control. In this embodiment, the temperature of the target material (amalgam in the lamp) is measured directly, and the applied heat is modulated either in a proportional fashion, or using a form of "pulse width modulation", where the heat is applied at a single level, and the on/off period depends on the heat loss from the target. While this method is generally the most accurate way to control a target temperature, it may also be relatively expensive, depending on the ease and expense of measuring the target temperature. This can be applied with individual temperature measurement and control for each lamp or with a single temperature measurement for the whole system, with all lamp thermal conditions modulated based on the single measurement.

In the closed loop temperature control embodiment, it is preferred to use a temperature sensor on the amalgam feature and/or an actual UV output measurement of the lamp as feedback to control the amount of power going to the lamp filaments. For lamp amalgam temperature measurement in real time, the desired temperature range of the amalgam feature may be determined in the laboratory under all potential operating conditions. If actual lamp output is to be used, either with or separate from amalgam feature temperature, the lamp output value and heat output to the filaments would be dithered so as to achieve maximum efficiencies for any set of conditions—i.e. power setting, water temperature, lamp life and the like.

The closed loop temperature control embodiment is preferred in the following situations:

Lamp efficiency is the primary driver and the open loop, or semi-open loop options (discussed below) are not optimized in that regard.

Capital cost is outweighed by lamp operating cost reductions.

If the prescribed or allowable temperature range of the amalgam is small. Here, the inclusion of the amalgam temperature and/or actual lamp UV-C output would increase lamp efficiencies.

A non-limiting example of a first embodiment of closed loop temperature control wherein the heating level is based on feedback of target mercury amalgam temperature is shown in FIG. 1.

Figure 2:
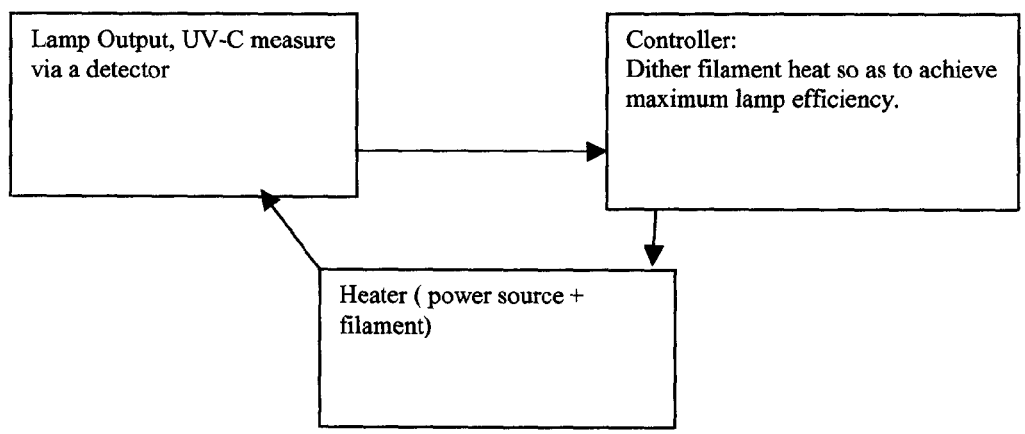

FIG. 2 illustrates a non-limiting example of a second embodiment of closed loop temperature control wherein the heating level is based on feedback of lamp UV-C output.

Open loop temperature control. In this embodiment, one does not need to measure the target temperature during operation. Instead, the target temperature is measured ahead of time over a broad range of conditions of flow, water temperature and power level or any other variables that may change in the installation, while holding fixed other parameters such as lamp size, materials of construction, etc. From this database of experiments, the amount of heat required for given conditions can be determined, and this information can be used to create a heat control algorithm that modulates heat based on known parameters (e.g. water temperature, lamp power level) other than target temperature.

Preferably, the open loop temperature control embodiment comprises determining and/or modifying fixed lamp and lamp assembly parameters so as to achieve an optimal amalgam temperature during lamp operation.

Parameters could be set in a laboratory environment and adjusted so as to achieve the amalgam temperature target. Some parameters could be fixed for the product line and some parameters could vary during lamp operation or from site to site.

Non-limiting examples of fixed parameters include: sleeve diameter, maximum lamp power, lamp power range, lamp orientation, lamp diameter, lamp internal design, lamp base design, dimension of the filament, composition of the filament, configuration of the filament, lamp orientation in the sleeve and amalgam thermal profile.

Non-limiting examples of variable parameters include water temperature, electrode changes that occur during the lamp life cycle, i.e. emitter paste sputtering and the like.

Values that are determined in the lab (e.g., water temperature) could then be put into an algorithm that then could be downloaded to an integrated circuit (e.g., a chip) that would control the filament heating power. At various power settings, the integrated circuit (e.g., the chip) would calculate the required filament power and then output it to the lamp.

Dependant on the amalgam type and quality, this control method could be highly efficient and at the same time be relatively inexpensive to implement once the initial lab work is complete.

The open loop temperature control embodiment is preferred in the following situations:
Cost is a significant driver.
Sleeve diameter is set.
Lamp assembly geometry is set.
Lamp maximum power and power range is set.
Lamp orientation is set.
Treated fluid temperature range is set.
Lamp lifetime output degradation and component degradation is known.
The prescribed or useful amalgam temperature range is relatively large.

Figure 3:
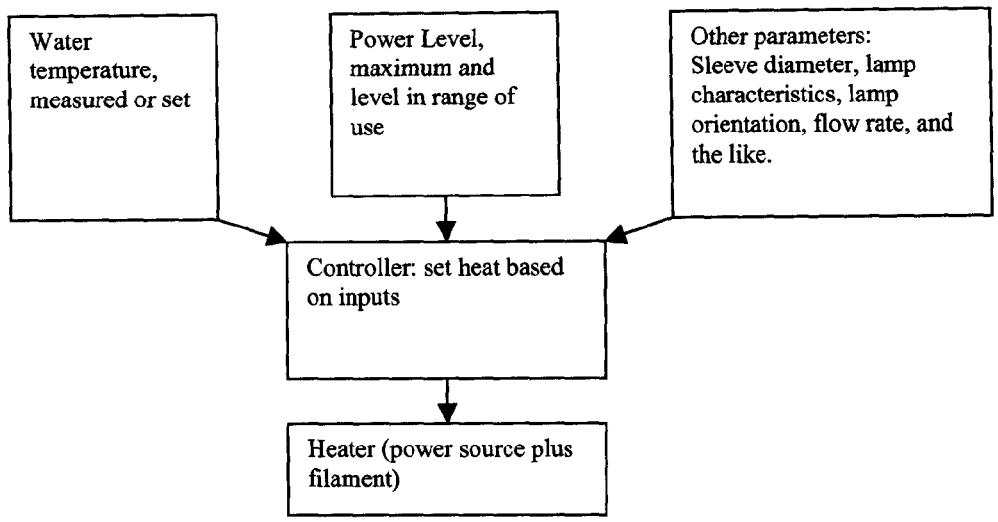
FIG. 3 illustrates a schematic for open loop temperature control of a mercury amalgam lamp.

FIG. 3 illustrates a non-limiting example of an embodiment of open loop temperature control wherein the heating level is based only on operating conditions (no mercury amalgam temperature measurement or lamp UV-C output measurement is taken for the purpose of controlling heating level of the former)

Indirect feedback control. In this embodiment, a parameter that is related to the target temperature of the mercury-containing material is measured, and heat is modulated based on an algorithm that is intended to keep the target temperature fixed. This may be achieved by measuring filament temperature (through its resistance or voltage), and is based on a correlation between amalgam temperature and the temperature of the filament.

Figure 4:
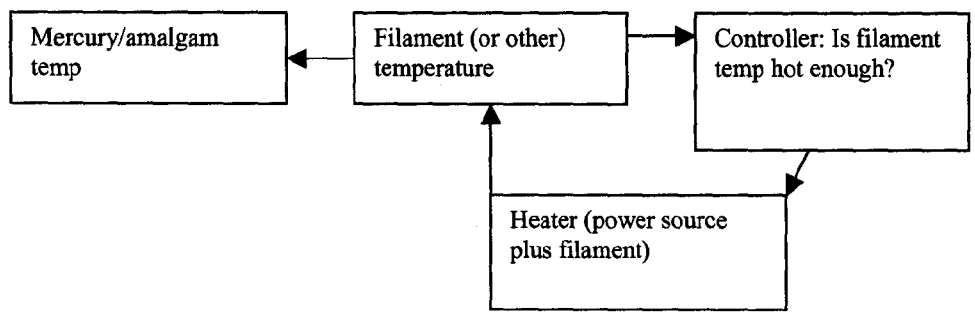
FIG. 4 illustrates a schematic for indirect feedback temperature control of a mercury amalgam lamp.

FIG. 4 illustrates a non-limiting example of an embodiment of the indirect feedback control wherein the heating level is based on a temperature that is related to the target temperature.

The present invention results in a number of advantages, including one or more of the following:
the present ultraviolet radiation lamp allows the mercury pressure to be optimized over a large range of power levels and fluid (e.g., water) temperatures.
the present ultraviolet radiation lamp eliminates the need for an additional heating or cooling circuit that would otherwise be required to control mercury temperature and pressure;
the present ultraviolet radiation lamp allows for ready increase in lamp output and efficiency at relatively low lamp power settings;
the present ultraviolet radiation lamp substantially reduces the impact of treated fluid temperature on amalgam temperature, and therefore on lamp output and efficiency;
the present ultraviolet radiation lamp substantially reduces the operating costs of UV disinfection systems used at reduced power settings for large percentages of their operating lifetimes; and
the present ultraviolet radiation lamp allows for a decrease in the cost of amalgam temperature control, since, in effect, the filament becomes the heater, and no external heater or cooler is required.

This invention achieves both of these objectives simultaneously without additional heating or cooling elements and the associated cost, complexity and reliability problems. This invention uses filament heating in a unique way, and the filament heat could be used for amalgam temperature control independently of filament lifetime enhancement requirements—i.e., filament heating would not be used exclusively for increasing filament life, only for amalgam feature thermal control. Of course, there will be many instances where the use of filament heating for both purposes would be beneficial.

This invention also allows a mercury-based, low pressure lamp with the amalgam near the filament (i.e., within or without the arc length of the lamp) to operate at or near optimal efficiency at very low power levels. With the amalgam behind (or otherwise in close proximity to) the filament and at low lamp power, once the amalgam gets too cool, the lamp will typically extinguish. In contrast, the present ultraviolet radiation lamp can continue to operate—this is a significant advantage of the present invention.

In the preferred embodiment of this invention, the amalgam feature(s) or mercury-containing material of the lamp is located near a filament. The power supply contains a circuit designed to provide current through the filament to modify its temperature. Furthermore, a temperature sensitive element such as a thermocouple, a RTD (Resistive Thermal Device), a thermal switch and the like (there are many other examples within the purview of a person skilled in the art) is provided in order to provide a response to the amalgam temperature. The current through the filament is modified in response to changes in the temperature sensitive element so that the heat generated in the filament results in an optimum temperature at the amalgam—i.e., the temperature of the amalgam is maintained such that optimal operating efficiency of the lamp may be achieved. As is known in the art, at this temperature the amalgam (or mercury-containing material) is vaporized which causes electrical excitation which in turn cause production of the ultraviolet radiation.

Thus, the present invention eliminates the need for separate heating elements or for controlled cooling elements, and is able to optimize amalgam temperature independent of arc current.

For the use of filament heating for amalgam temperature control, the current could be optimized only for amalgam temperature control, or it could be optimized for both filament lifetime and amalgam temperature control.

In normal operation of a low pressure ultraviolet radiation lamp, the filament temperature is determined by the arc current, which heats the filament by resistive heating, through the cathode fall voltage, and from the heat of the nearby arc. In one embodiment of the present invention, this normal heating approach could be optimized for only one power setting if this heat were to be used for amalgam temperature control. In such an embodiment, if the power is reduced, the filament temperature is reduced as the thermal energy input to the filament is also directly reduced.

Low filament temperatures can result in shortened lamp lifetime since the cold filament tends to sputter during ignition or during operation. In conventional filament heating, a current separate from the arc current is sent through the filament (each filament at each end of the lamp has two connections, thereby creating an electrical path across the filament coil) in order to increase the filament temperature to ease ignition or to extend lamp life. For the use of filament heating for amalgam temperature control in accordance with the present invention, the current could be optimized only for amalgam temperature control, or it could be optimized for both filament lifetime and amalgam temperature.

In one embodiment of the present invention, it is possible to pass a current through the lamp filament(s) in a circuit that is separate from the lamp circuit. This current may be set at various pre-determined values dependant on the power setting of the lamp so as to ensure optimum amalgam temperature.

In another embodiment it is possible to set the amalgam feature in a location that ensures that the majority of its thermal energy that is required to achieve optimal operating conditions, comes from the heat dispersed from the lamp filament(s).

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

For example, it is possible to modify the closed loop temperature control embodiment above to utilize a semi-closed loop control. This would be similar to the closed loop embodiment discussed above, however only one lamp per system or per bank would have the feedback system. The rest of the lamps would receive an input as to the required filament heat power based on the single closed loop lamp. This system is generally applicable in situations as above for closed loop.

Further, a basic control algorithm could be used with the closed loop temperature control embodiment, so as to approximate operation of the lamp. This method also ensure operation of the lamp, even if the temperature measurement device on the amalgam feature and/or the UV output measurement device pointed at the lamp were to fail.

Still further, it is possible to modify the open loop temperature control embodiment above to utilize a semi-open loop control. This would be similar to the open loop control method discussed above, however in this modification, the water temperature variable would not be averaged. In this control method there could be two options: (i) input water temperature (or another variable as discussed herein) manually into the lamp control interface (at the site at which the lamp is being used or during manufacture of the radiation source module and/or radiation treatment system) and from there into the control algorithm, or (ii) measure the water temperature at one location in the flow path and input that value into the control algorithm. This embodiment could be much more accurate at determining the appropriate filament power setting than the basic open loop design, and does not add much complexity to the system (input screen for the site water temperature or one temperature sensor and input for the entire system). This modification is particularly preferred in the following situations:

Cost is a driving factor.
Sleeve diameter is set.
Lamp assembly geometry is set.
Lamp maximum power and power range is set.
Lamp orientation is set.
Treated fluid temperature range is set.
Lamp lifetime output degradation and component degradation is known.
If the prescribed or allowable temperature range of the amalgam is small. Here, the inclusion of the amalgam temperature and/or actual lamp UV-C output would increase lamp efficiencies.

Those of skill in the art will appreciate that it is possible to envision an embodiment in which the user inputs lamp orientation or another normally fixed parameter such as sleeve diameter (e.g., one for waste water and one for drinking water). Thus, the semi-open loop embodiment could be adapted to utilize manual inputs for any parameter.

Further, many of the embodiments of the invention discussed above relate to the use of a thermal sensor, integrated circuit, radiation detector and the like to facilitate operation of the electrical control element of the present ultraviolet radiation lamp. It will be appreciated by those of skill in art that it is possible and, in some cases, preferred to utilize a single thermal sensor, integrated circuit, radiation detector and the like in combination with a plurality of ultraviolet lamps (e.g., in a radiation source module or fluid treatment system). Thus, it is possible to have a radiation source module comprising a plurality of ultraviolet radiation lamps disposed therein. Each lamp would comprise a substantially sealed cavity comprising a mercury-containing material; a filament disposed in the sealed cavity; and the electrical control element discussed above. The module would further comprise a single thermal sensor, integrated circuit, radiation detector and the like appropriately connected to the electrical control element.

Such a rationalized approach can also be adopted with respect the electrical control element—i.e., a single electrical control element would be used to control a plurality of ultraviolet radiation lamps disposed therein. Each lamp would comprise a substantially sealed cavity comprising a mercury-containing material and a filament disposed in the sealed cavity. In this embodiment, it would be possible to use a single or a plurality of the thermal sensor, integrated circuit, radiation detector and the like.

All publications, patents and patent applications referred to herein are incorporated by reference in their entirety to the same extent as if each individual publication, patent or patent application was specifically and individually indicated to be incorporated by reference in its entirety.

What is claimed is:

1. An ultraviolet radiation lamp system for treating a fluid, comprising:
a substantially sealed cavity comprising a mercury-containing material;
a filament disposed in the sealed cavity; and
an electrical control element in contact with the filament, the electrical control element configured to maintain a temperature of the mercury-containing material with respect to a predetermined temperature, the electrical control element comprising an integrated circuit containing an algorithm which maintains the temperature of the mercury-containing material by modulating a current through the filament based on (i) at least one predetermined fluid parameter of the fluid to be treated, other than sensed lamp temperature, and (ii) predetermined target temperatures of the mercury-containing material with respect to values of the at least one predetermined fluid parameter.

2. The ultraviolet radiation lamp system defined in claim 1, further comprising an electrical connection unit disposed at one end of the cavity and comprising at least one electrical connector in electrical connection with the filament.

3. The ultraviolet radiation lamp system defined in claim 2, wherein the electrical connection unit comprises a first connection unit disposed at one end of the lamp and a second connection unit releasably engageable with respect to the first connection unit.

4. The ultraviolet radiation lamp system defined in claim 3, wherein the electrical control element is disposed in the first connection unit.

5. The ultraviolet radiation lamp system defined in claim 3, wherein the electrical control element is disposed in the second connection unit.

6. The ultraviolet radiation lamp system defined in claim 3, wherein the first connection unit and the second connection unit have a substantially complementary fit.

7. The ultraviolet radiation lamp system defined in claim 3, wherein the second connection unit comprises a receptacle portion for receiving the at least one electrical connector when the first connection unit and the second connection unit are engaged.

8. The ultraviolet radiation lamp system defined in claim 1, wherein the mercury-containing material is disposed in a first portion in the cavity.

9. The ultraviolet radiation lamp system defined in claim 8, wherein the first portion of the cavity is disposed substantially near the filament.

10. The ultraviolet radiation lamp system defined in claim 8, wherein the first portion of the cavity is disposed adjacent the filament.

11. The ultraviolet radiation lamp system defined in claim 1, wherein the predetermined target temperature is empirically determined with respect to (i) the at least one predetermined fluid parameter, and (ii) at least one other predetermined operational parameter.

12. The ultraviolet radiation lamp system defined in claim 11, wherein the predetermined target temperature is empirically determined with respect to two or more predetermined fluid parameters of the fluid to be treated.

13. The ultraviolet radiation lamp system defined in claim 11, wherein the at least one other predetermined operational parameter is a fixed parameter.

14. The ultraviolet radiation lamp system defined in claim 13, wherein the fixed parameter is selected from the group comprising sleeve diameter, maximum lamp power, lamp power range, lamp orientation, lamp diameter, lamp internal design, lamp base design, dimension of the filament, composition of the filament, configuration of the filament and lamp orientation in the sleeve.

15. The ultraviolet radiation lamp system defined in claim 11, wherein the at least one other predetermined operational parameter is a variable parameter.

16. The ultraviolet radiation lamp system defined in claim 15, wherein the variable parameter is selected from lamp power, and electrode changes that occur during the lamp life cycle of the lamp.

17. A radiation source assembly comprising the ultraviolet radiation lamp system defined in claim 1 and a radiation transparent protective sleeve therefore.

18. A radiation source module comprising a first support element and at least one radiation source assembly as defined in claim 17 connected at a first end thereof to the first support element.

19. The radiation source module defined in claim 18, comprising a plurality of radiation source assemblies connected at respective first ends thereof to the first support element.

20. The radiation source module defined in claim 18, further comprising a second support element to which is connected a second end of the at least one radiation source assembly.

21. A fluid treatment system comprising the radiation source assembly defined in claim 17.

22. A fluid treatment system comprising a plurality of radiation source assemblies as defined in claim 17.

23. A fluid treatment system comprising the radiation source module defined in claim 18.

24. A fluid treatment system comprising a plurality of radiation source modules as defined in claim 18.

25. The ultraviolet radiation lamp system defined in claim 1, wherein the integrated circuit includes a memory storing (i) a plurality of predetermined fluid parameters relating to the fluid being treated, and (ii) a plurality of filament current values corresponding to the plurality of predetermined fluid parameters, and wherein the integrated circuit selects one of said plurality of filament current values corresponding to one of the plurality of predetermined fluid parameters.

26. The ultraviolet radiation lamp system defined in claim 1, wherein the fluid parameter comprises water temperature.

27. The ultraviolet radiation lamp system defined in claim 26, wherein the water temperature is predetermined.

28. The ultraviolet radiation lamp system defined in claim 26, wherein the algorithm maintains the temperature of the mercury-containing material based on detected water temperature.

29. An ultraviolet radiation lamp comprising:
a substantially sealed cavity comprising a mercury-containing material having a predetermined optimum temperature range in which the mercury-containing material is vaporized;
a filament disposed in the sealed cavity;
an electrical control element in contact with the filament, the electrical control element configured to cause the temperature of the mercury-containing material to remain substantially within the predetermined optimum temperature range; and
a thermal sensor in contact with the electrical control element and the mercury-containing material, the thermal sensor configured to detect and respond to a change in temperature of the mercury-containing material.

30. The ultraviolet radiation lamp defined in claim 29, wherein the electrical control element is in electrical contact with the filament and the thermal sensor, the electrical control element configured to change the temperature of the filament in response to a signal received from the thermal sensor to cause the temperature of the mercury-containing material to remain substantially within the predetermined optimum temperature range.

31. The ultraviolet radiation lamp defined in claim 29, wherein the thermal sensor comprises a thermocouple.

32. The ultraviolet radiation lamp defined in claim 29, wherein the thermal sensor comprises a thermal switch or a RTD.

33. The ultraviolet radiation lamp defined in claim 29, wherein a portion of the thermal sensor is disposed in the cavity.

34. The ultraviolet radiation lamp defined in claim 29, wherein the thermal sensor is disposed in an annular element surrounding at least a portion of the cavity.

35. The ultraviolet radiation lamp defined in claim 29, further comprising an electrical connection unit disposed at one end of the cavity and comprising at least one electrical connector in electrical connection with the filament.

36. The ultraviolet radiation lamp defined in claim 35, wherein the electrical connection unit comprises a first connection unit disposed at one end of the lamp and a second connection unit releasably engageable with respect to the first connection unit.

37. The ultraviolet radiation lamp defined in claim 36, wherein the electrical control element is disposed in the first connection unit.

38. The ultraviolet radiation lamp defined in claim 36, wherein the electrical control element is disposed in the second connection unit.

39. The ultraviolet radiation lamp defined in claim 36, wherein the first connection unit and the second connection unit have a substantially complementary fit.

40. The ultraviolet radiation lamp defined in claim 36, wherein the second connection unit comprises a receptacle portion for receiving the at least one electrical connecter when the first connection unit and the second connection unit are engaged.

41. The ultraviolet radiation lamp defined in claim 29, wherein the mercury-containing material is disposed in a first portion in the cavity.

42. The ultraviolet radiation lamp defined in claim 41, wherein the first portion of the cavity is disposed substantially near the filament.

43. The ultraviolet radiation lamp defined in claim 41, wherein the first portion of the cavity is disposed adjacent the filament.

44. An ultraviolet radiation lamp comprising:
a substantially sealed elongate cavity comprising a first filament and a second filament disposed therein near opposite ends thereof;
a reservoir disposed in the cavity;
a mercury-containing material disposed in the reservoir, the mercury-containing material having a predetermined optimum temperature range in which the mercury-containing material is vaporized; and
an electrical control element in contact with the filament, the electrical control element configured to cause the temperature of the mercury-containing material to remain substantially within the predetermined optimum temperature range, the electrical control element (i) comprising structure for measuring filament temperature through indirect monitoring of at least one of filament resistance and filament voltage, and (ii) configured to regulate the temperature of the mercury-containing material based on correlation of the temperature of the mercury-containing material and the temperature of the filament.

45. An ultraviolet radiation lamp for treating a fluid, comprising:
a substantially sealed cavity comprising a mercury-containing material;
a filament disposed in the sealed cavity;
a detector configured to measure ultraviolet radiation from the sealed cavity during operation of the lamp; and
an electrical control element in contact with the detector and the filament, the electrical control element configured to maintain a temperature of the mercury-containing material with respect to a predetermined temperature by modulating a current through the filament based on (i) at least one predetermined fluid parameter of the fluid to be treated, other than sensed lamp temperature and sensed mercury-containing-material temperature, and (ii) predetermined target temperatures of the mercury-containing material with respect to values of the at least one predetermined fluid parameter, and (iii) the measured ultraviolet radiation from the detector.

46. The ultraviolet radiation lamp defined in claim 45, wherein at least a portion of the detector is disposed within the cavity.

47. The ultraviolet radiation lamp defined in claim 45, wherein the detector is disposed outside the cavity.

48. The ultraviolet radiation lamp defined in claim 45, further comprising an electrical connection unit disposed at one end of the cavity and comprising at least one electrical connector in electrical connection with the filament.

49. The ultraviolet radiation lamp defined in claim 48, wherein the electrical connection unit comprises a first connection unit disposed at one end of the lamp and a second connection unit releasably engageable with respect to the first connection unit.

50. The ultraviolet radiation lamp defined in claim 49, wherein the electrical control element is disposed in the first connection unit.

51. The ultraviolet radiation lamp defined in claim 49, wherein the electrical control element is disposed in the second connection unit.

52. The ultraviolet radiation lamp defined in claim 49, wherein the first connection unit and the second connection unit have a substantially complementary fit.

53. The ultraviolet radiation lamp defined in claim 49, wherein the second connection unit comprises a receptacle portion for receiving the at least one electrical connecter when the first connection unit and the second connection unit are engaged.

54. The ultraviolet radiation lamp defined in claim 45, wherein the mercury-containing material is disposed in a first portion in the cavity.

55. The ultraviolet radiation lamp defined in claim 54, wherein the first portion of the cavity is disposed substantially near the filament.

56. The ultraviolet radiation lamp defined in claim 54, wherein the first portion of the cavity is disposed adjacent the filament.

57. The ultraviolet radiation lamp defined in claim 45, wherein the predetermined target temperature is within an range prescribed for optimum operation of the lamp.

* * * * *